Sept. 10, 1935.  S. KROLL ET AL  2,014,085
BABY CARRIAGE BRAKE AND ANTITIPPING DEVICE
Filed Oct. 12, 1934  2 Sheets-Sheet 1

INVENTORS.
Samuel Kroll and
Nathan J. Kroll
BY Threedy and Gannon
THEIR ATTORNEYS.

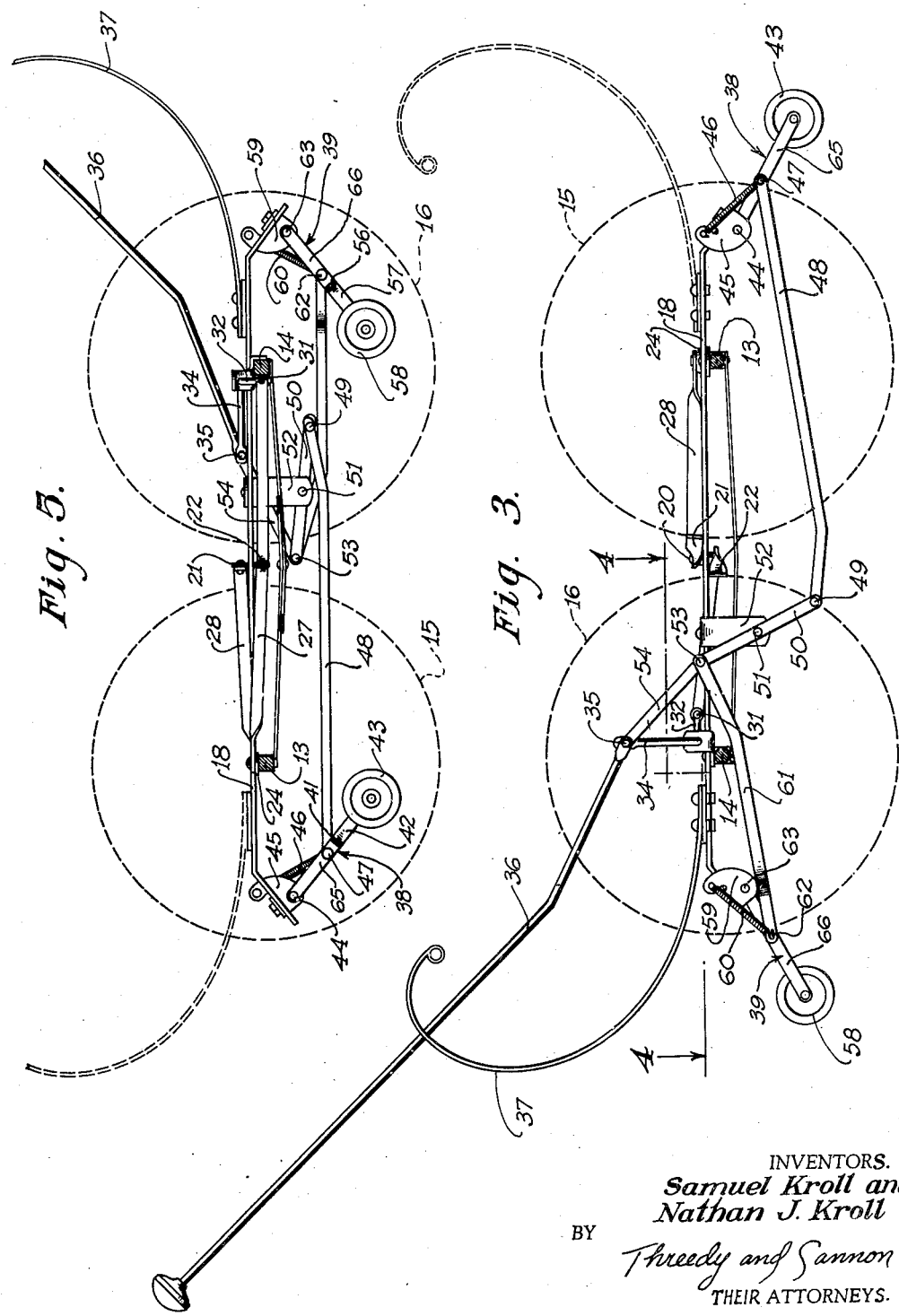

Patented Sept. 10, 1935

2,014,085

UNITED STATES PATENT OFFICE 2,014,085

BABY CARRIAGE BRAKE AND ANTITIPPING DEVICE

Samuel Kroll and Nathan J. Kroll, Chicago, Ill.

Application October 12, 1934, Serial No. 748,043

2 Claims. (Cl. 188—20)

This invention relates to a baby carriage.

It is an object of this invention to provide an improved baby carriage which is relatively simple and inexpensive in construction and efficient in use.

Another object of this invention is to provide in a baby carriage an anti-tipping device arranged at the front of the carriage and another device arranged at the rear of the same for preventing tipping of the carriage either forwardly or rearwardly, and a single and common operating means for moving both of the anti-tipping devices into effective and ineffective positions.

Another object of the invention is to associate both the front and the rear anti-tipping devices with the brake-operating mechanism of the vehicle in such a manner that a single and common operating means suffices for simultaneously moving both of the anti-tipping devices and the brakes of the carriage into effective and ineffective positions.

Heretofore in the art baby carriages have been provided with anti-tipping devices but the same have been arranged at only one end of the carriage, either at the front or rear, with the result that if the occupant of the carriage should shift his weight too far toward the end of the same opposite that at which the anti-tipping device happened to be arranged, the carriage would be very apt to tip over.

Another object of the present invention, therefore, is to overcome the aforementioned objectionable feature of the prior art baby carriages and to provide a baby carriage which will not tip in either direction.

Other objects will appear hereinafter.

The invention consists in the novel combination and arrangement of parts to be hereinafter described and claimed.

The invention will best be understood by reference to the accompanying drawings, showing the preferred form of construction and in which:

Fig. 3 is a side elevational view on line 3—3 in Fig. 2;

Fig. 5 is a sectional view on line 5—5 in Fig. 2.

Figure 1:
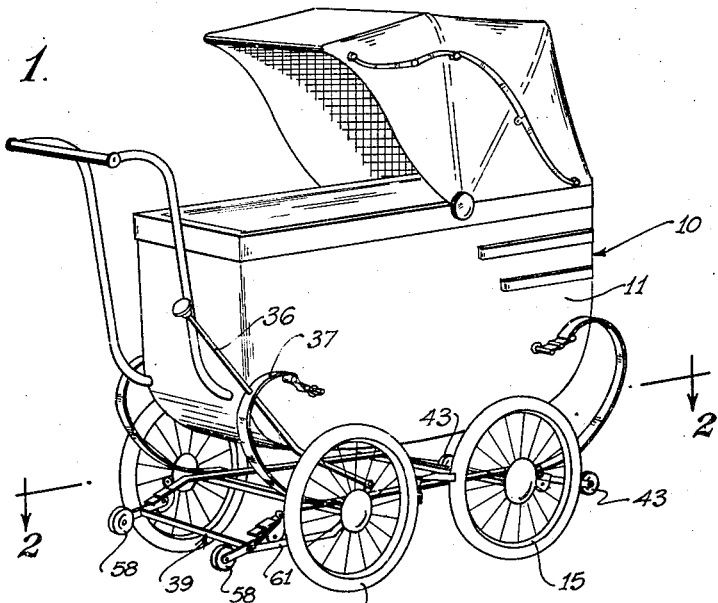
Fig. 1 is a perspective view of a baby carriage embodying a preferred form of the invention.

A preferred form of the present invention is shown in the drawings and is therein shown in conjunction with a baby carriage or coach of conventional design, generally indicated at 10, and including a body 11 and a supporting frame 12, the latter including front and rear axles 13 and 14, respectively, which carry front and rear wheels 15 and 16, respectively.

Pivotally mounted in parallel horizontal bars 17 and 18 of the frame 12, adjacent the ends of said bars, as at 19 and 20, are two oppositely movable brake members 21 and 22 which are engageable with the front and rear wheels 15 and 16, respectively, of the vehicle 10.

Pivotally mounted between its ends, as at 23, on the front axle 13 of the vehicle frame 12, is a horizontal bar 24 (Fig. 2) and pivotally connected to opposite end portions of the bar 24, as at 25 and 26, respectively, are two parallel and horizontal brake operating rods 27 and 28; the rod 28 being connected, at its rear end, as at 29, to the front wheel brake member 21, between the ends of the latter, and the brake-operating rod 27 being pivotally connected between its ends, as at 30 (Fig. 2) to the rear wheel brake member 22; this brake-operating rod 27 being pivotally connected at its rear end, as at 31, to an arm 32 of a second horizontal brake-operating rod 33 which is suitably journalled upon the frame 12 and extends parallel to the rear axle 14. The brake-operating rod 33 has at its other end (Figs. 2 and 3) an arm 34 and pivotally connected to this arm 34, as at 35, is an operating member or push rod 36 which acts as a common operating member for the brake members 21 and 22 and for both the front and rear anti-tipping devices 38 and 39, as will be explained more fully presently; this common operating member or push rod 36 being slidably projected between its ends through a suitable opening provided therefor in a resilient curved supporting member 37 (Fig. 3) which is attached at its lower end to the carriage frame 12 and projected upwardly and rearwardly of the body 11 of the carriage.

In the present invention there are associated with the common operating member or push rod 36 two similar anti-tipping devices, generally indicated at 38 and 39, respectively, the anti-tipping device 38 being arranged at the front of the carriage and the anti-tipping device 39 being arranged at the rear of the carriage.

The front anti-tipping device 38 includes a U-shaped member 40 having a horizontal central portion or bar 41 which extends transversely relative to the body of the vehicle and this bar 41 has at its ends depending arms 42, each of the arms 42 having a wheel or castor 43 rotatably journalled therein. Each of these arms 42 is attached to a member 65 (Fig. 2) and these members 65 are pivotally mounted, as at 44 (Figs. 3 and 5) in brackets 45 which are supported by the side rails 17 and 18 of the frame 12.

Figure 2:
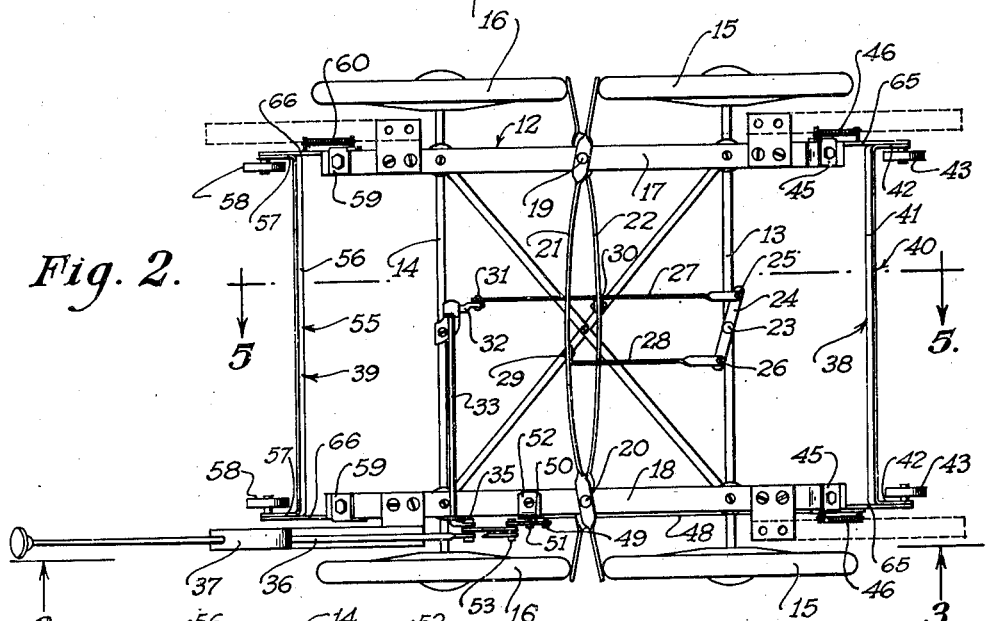
Fig. 2 is a top plan view on line 2—2 in Fig. 1.

Pivotally connected at the front end, as at 47, to one of the castor-supporting arms 42 is an operating bar 48 and this bar 48 is pivotally connected at its rear ends, as at 49, to a link 50, the link being pivotally mounted between its ends as at 51, upon a bracket 52 which is attached to and depends from the side rail 18 of the frame 12 (Figs. 2, 3 and 5). This link 50 is pivotally connected at its other end, as at 53, to the lower end of a link 54, which, in turn, is pivotally connected at its upper end, at 35, to the common operating member or push rod 36.

Having these upper ends attached to the brackets 45 and having their lower ends attached to the pivotal connections 47 are springs 46 (Fig. 3).

The rear anti-tipping device 39 is similar in construction to the front anti-tipping device 38 and comprises a U-shaped member 55 which includes a horizontal portion 56 having at its ends depending arms 57 which carry wheels or castors 58, each of these arms 57 being attached to a member 66 (Fig. 2) and these members 66 being pivotally mounted, as at 63, (Figs. 3 and 5) in brackets 59, similar to the brackets 45, and the brackets 59 being carried by and depending from the horizontal side rails 17 and 18 of the frame 12 at the rear of the latter.

Having their upper ends attached to the brackets 59 and having their lower ends attached to the pivotal connections 62 are springs 60 (Fig. 3).

Figure 4:
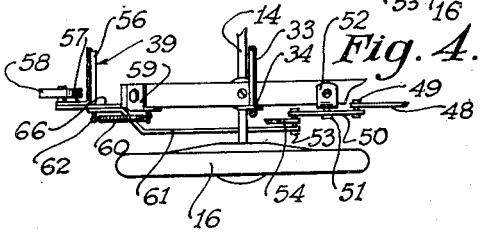
Fig. 4 is a fragmentary detail view on line 4—4 in Fig. 3.

Pivotally connected at one end, as at 62, to the U-shaped member 55 (Figs. 3 and 4) is a rod or bar 61 which extends under the rear axle 14 and is pivotally connected, at 53, to the links 50 and 54 (Fig. 3).

*Operation*

The anti-tipping devices 38 and 39 are normally retained in collapsed, or folded and ineffective position (as in Fig. 5) by the frictional latching engagement of the push rod 36 in the aperture provided in the supporting member 37 to receive the same.

However, should the operator of the carriage desire to move the castor carriages or anti-tipping devices 38 and 30 from ineffective position, as in Fig. 5, into effective position, as in Fig. 3, this may be accomplished by pulling upwardly on the operating member or push rod 36. This upward movement of the operating rod 36 rocks the brake-operating rod 34—33 and the link 54 (counterclockwise, Fig. 3) and in so doing rocks the member 50 at 51 (counterclockwise, Fig. 3), thereby moving the operating link or bar 61, at 53, and thereby swinging the bar 61 (right to left, Fig. 3). This movement of the bar 61 rocks the rear anti-tipping device or caster-supporting carriage 39 (clockwise, Fig. 3) at its points of pivotal connection 63 with its supporting brackets 59, and thus moves the rear anti-tipping device 39 and its castors 58 into effective position, as in Figs. 1 and 3.

At the same time this upward movement of the push rod 36 and consequent rocking motion imparted to the member 50 (counterclockwise, Fig. 3) acts through the link or bar 48 to pivot the front anti-tipping device 38 (counterclockwise, Fig. 3) at its points of pivotal connection 44 with its supporting brackets 45, thereby moving the front anti-tipping device 38 into effective position, as in Fig. 3, simultaneously with the movement of the rear anti-tipping device 39 into effective position, and by the same single operation; the anti-tipping devices 38—39 being retained in effective position by frictional engagement of the operating member or push rod 36 with the opening in its supporting member 37 and through which it is slidably projected; and the anti-tipping devices 38—39 being prevented from "sticking" in dead center positions by the springs 46 and 60 which are eccentrically mounted at their upper ends upon the brackets 45 and 59, respectively, relative to the pivotal connections 44 and 63 of the anti-tipping devices 38 and 39 with their supporting brackets 45 and 59, respectively, (Fig. 3).

In order to reset the anti-tipping devices 38 and 39 into ineffective position, as in Fig. 5, the operator of the carriage pushes downwardly upon the operating member of push rod 36, thereby rocking the brake-operating rod 34—33 and link 54 (clockwise, Fig. 3). This motion of the member 54 retracts the bar 61 (left to right, Fig. 3) and this movement of the bar 61 pivots the rear anti-tipping device 39 (counterclockwise, Fig. 3, clockwise, Fig. 5) into ineffective position, as in Fig. 5; while at the same time this downward movement of the push rod 36, acting through the brake-operating rod 34—33 and the link 54, rocks the member 50 (clockwise, Fig. 3), and this movement of the member 50 retracts the bar 48 (right to left, Fig. 3) and in so doing pivots the front anti-tipping device 38 (clockwise, Fig. 3, counterclockwise, Fig. 5) into ineffective or collapsed position, as in Fig. 5.

It is to be noted that when the anti-tipping devices 38 and 39 are in effective or extended position, as in Fig. 3, they effectively prevent the carriage 10 from tipping over either forwardly or rearwardly should the occupant of the carriage shift his weight too far to either the front or rear of the carriage. In this manner the present invention overcomes a deficiency in the prior art carriages which have, in general, been effective to prevent tipping of the carriage in only one direction, that is, either forwardly or rearwardly.

Another advantage of the present invention is that the single operation of pulling upwardly upon the operating member or push rod 36 not only moves both the front and the rear anti-tipping devices 38 and 39 into effective position, as in Fig. 3; but likewise sets the brakes 21—22 into effective position, thus assuring the operator of the carriage that the same will not move or tip over when once the operating rod 36 has been pulled upwardly into effective position; and thereby further assuring the mother or operator of the carriage that she may set the brakes 21 and 22 and the anti-tipping devices 38 and 39 in effective position and leave the carriage with the assurance that the same will not move from its intended position or tip over should the occupant of the carriage shift his weight either too far forwardy or rearwardly.

The upward movement of the operating member or push rod 36 rocks the brake-operating shaft 33—34 (counterclockwise, Fig. 3) and this movement of the shaft 33—34 acts through the arm 32 and pivotal connection 31 to move the brake-operating rod 27 (left to right, Fig. 2) thereby pivoting or spreading the brakes 22, at their points of suspension 19 and 20, into engagement with the rear wheels 16 of the carriage. At the same time, this movement of the brake-operating rod 27 acts upon the member 24 to rock the latter (clockwise, Fig. 2) thereby moving the brake-operating rod 28 (right to left, Fig. 2), and this movement of the brake-operating rod 28 acts upon the brake member 21 to spread or pivot the latter, at its points of suspension 19 and 20, into engagement with the front wheels 15 of the carriage. In this manner, the resilient brakes 21 and 22 are set into effective position against all four wheels 15 and 16 of the carriage simultaneously with the operation of moving the front and rear anti-tipping devices 38 and 39 into effective position.

The same downward push on the operating member or push rod 36 which acts to move the front and rear anti-tipping devices 38 and 39 into ineffective or collapsed position, as in Fig. 5, also acts to release the brakes 21—22 from braking engagement with the front and rear wheels 15 and 16 of the carriage, this operation being as follows: The downward movement of the push rod 36 acts upon the brake-operating rod 34—35 to rock the latter (clockwise, Fig. 3), and this movement of the shaft 33—34 acts to move the brake-operating rod 27 (right to left, Fig. 2), this movement of the brake-operating rod 27 acting upon the resilient or yieldable brake member 22 to pivot or spread the latter, at its points of suspension 19 and 20, out of engagement with the rear wheels 16 of the carriage. At the same time, this movement of the brake-operating rod 27 (right to left, Fig. 2) acts upon the member 24 to rock the latter (counterclockwise, Fig. 2) and this movement of the member 24 acts upon the brake-operating rod 28 to move the latter (left to right, Fig. 2); this movement of the brake-operating rod 28 acting upon the resilient or yieldable brake member 21 to move or spread the latter, at its points of suspension 19 and 20, out of braking engagement with the front wheels 15 of the carriage 10.

While we have illustrated and described the preferred form of construction for carrying our invention into effect, this is capable of variation and modification, without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A baby carriage, comprising the combination of: a supporting frame; a body, and front and rear wheels carried by said supporting frame; a device movably mounted upon said supporting frame at the front of the latter, and independent of the said front wheels of the said carriage, for preventing forward tipping of the said carriage; a device movably mounted upon the said supporting frame at the rear of the latter, and independent of the said rear wheels of the said carriage, for preventing rearward tipping of the same; and means for simultaneously moving both of said devices into and out of effective and ineffective positions.

2. A baby carriage, comprising the combination of: a supporting frame; a body, and front and rear wheels carried by said supporting frame; brakes for said wheels; a device movably mounted upon said supporting frame at the front of the latter, and independent of the said front wheels of the said carriage, for preventing forward tipping of the said carriage; a device movably mounted upon the said supporting frame at the rear of the latter, and independent of the said rear wheels of the said carriage for preventing rearward tipping of the same; and a common operating means for simultaneously moving both of said devices and said brakes into and out of effective and ineffective positions.

SAMUEL KROLL.
NATHAN J. KROLL.